(12) United States Patent
Takeuchi et al.

(10) Patent No.: US 7,817,738 B2
(45) Date of Patent: Oct. 19, 2010

(54) DIGITAL BROADCASTING RECEIVING APPARATUS WITH CHANNEL ESTIMATION FUNCTION

(75) Inventors: Mitsuru Takeuchi, Tokyo (JP); Masakazu Morita, Tokyo (JP); Tadashi Sakaguchi, Tokyo (JP); Jun Ido, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 680 days.

(21) Appl. No.: 11/794,699

(22) PCT Filed: Nov. 21, 2005

(86) PCT No.: PCT/JP2005/021378
§ 371 (c)(1),
(2), (4) Date: Jul. 3, 2007

(87) PCT Pub. No.: WO2006/087856
PCT Pub. Date: Aug. 24, 2006

(65) Prior Publication Data
US 2009/0274038 A1 Nov. 5, 2009

(30) Foreign Application Priority Data
Feb. 15, 2005 (JP) ............................. 2005-037841

(51) Int. Cl.
*H04L 27/06* (2006.01)
*H04L 27/28* (2006.01)
*H04L 25/08* (2006.01)
(52) U.S. Cl. .................... 375/260; 375/340; 375/346

(58) Field of Classification Search ................ 375/260, 375/340, 346
See application file for complete search history.

(56) References Cited

U.S. PATENT DOCUMENTS

2005/0105647 A1* 5/2005 Wilhelmsson et al. ....... 375/316

FOREIGN PATENT DOCUMENTS

| JP | 2000-115087 A | 4/2000 |
|---|---|---|
| JP | 2000-125151 A | 4/2000 |
| JP | 2001-77787 A | 3/2001 |
| JP | 2002-261729 A | 9/2002 |
| JP | 2003-87153 A | 3/2003 |
| JP | 2004-40507 A | 2/2004 |
| JP | 2004-96187 A | 3/2004 |
| JP | 2004-179816 A | 6/2004 |
| JP | 2004-304618 A | 10/2004 |

* cited by examiner

*Primary Examiner*—Don N Vo
(74) *Attorney, Agent, or Firm*—Birch, Stewart, Kolasch & Birch, LLP (57) ABSTRACT

A delay profile generating circuit 9 generates a delay profile signal. Concerning the delay profile signal, a ghost decision circuit 10 makes a decision as to the presence or absence of ghosts that will appear during traveling of a mobile vehicle in response to a transmission mode signal fed from a changeover switch 8. The delay profile signal and the decision signal about the presence/absence of the ghosts are delivered to a window control circuit 13 via an accumulator 11. The window control circuit 13 sets and controls the FFT window position of an FFT circuit 5 in response to a guard correlation signal fed from a guard correlation signal generating circuit 12 and a signal fed from the accumulator 11.

12 Claims, 8 Drawing Sheets

DIGITAL BROADCASTING RECEIVING APPARATUS WITH CHANNEL ESTIMATION FUNCTION

TECHNICAL FIELD

The present invention relates to a digital broadcasting receiving apparatus with a channel estimation function, which can estimate the conditions of an information transmission line under mobile receiving environments of orthogonal frequency division multiplexing (OFDM) digital broadcasting, and which controls a receiving state of the broadcasting in response to the estimation results.

BACKGROUND ART

As a means for estimating conditions of a transmission line of broadcasting information in digital broadcasting reception based on the orthogonal frequency division multiplexing (called "OFDM" from now on) which uses multiple carriers and transmits information discretely, delay profile calculation is known which represents characteristic delayed wave received power against delay time. The delay profile can provide information about a currently receiving incoming path (transmission line) environment. Accordingly, in a multipath environment having delayed waves mixed due to reflections from mountains and the like or in a multipath environment caused in an SFN (single frequency network), the delay profile can be used as a means for determining a starting position of an FFT (Fast Fourier Transform) window that will prevent the delay path components from bringing about inter-symbol interference, that is, that will place all the path components within a guard interval range.

As conventional technology concerning the delay profile, the following are known.

A conventional example 1 of the technology aims at obtaining the propagation conditions of the information transmission line by using an existing radio wave without using a special radio wave or receiver. It has such a configuration that performs FFT processing on a baseband signal with an FFT (Fast Fourier Transform) operation unit to transform it to a frequency axis signal, and extracts with a pilot signal extractor only a scattered pilot (SP) signal (called simply "pilot signal" from now on) which is used for amplitude/phase equalization and is disposed on a frequency axis, from the frequency axis signal output from the FFT operation unit. Subsequently, using an amplitude/phase frequency characteristic detector, it interpolates the pilot signal for the amplitude/phase equalization, and generates and outputs frequency characteristic signals concerning the amplitude and phase, respectively. Besides, using an IFFT (Inverse Fast Fourier Transform) operation unit, it obtains a time axis signal of the output of the amplitude/phase frequency characteristic detector, and detects the delayed wave received power against the delay time. It displays the power thus obtained on a display unit in a predetermined format as a delay profile, and stores in a data storage if necessary (see Patent Document 1, for example).

A conventional example 2 of the technology aims to improve the quality of a received signal when receiving a digital broadcast based on the OFDM modulation by controlling an FFT window to an appropriate position quickly even when receiving a delayed wave including a preghost signal. It has such a configuration that implements a digital broadcasting receiving apparatus which includes: an FFT section for performing a Fourier transform by extracting an effective symbol period from transmission symbols of the OFDM signal; a guard correlator for obtaining correlation between the OFDM signal and its delay signal and outputting guard correlation results; a delay profile calculating section for performing inverse FFT of the pilot signal of the OFDM signal to obtain the delay profile; and a timing signal generator for mixing a signal corresponding to the guard correlation results and a signal corresponding to the delay profile, and for generating a timing signal for controlling the calculation range according to the resultant signal of the mixing (see Patent Document 2, for example).

Patent Document 1: Japanese patent application laid-open No. 2000-115087.
Patent Document 2: Japanese patent application laid-open No. 2004-96187.

The conventional delay profile generating technology in the OFDM digital broadcasting reception, and the application technology of the delay profile are configured as described above. They offer the following advantages: the former can obtain the propagation conditions of the information transmission line without using a special radio wave or receiver; and the latter can improve the quality of the received signal. Both the technologies, however, cannot cope with an environment in which the digital broadcasting receiving apparatus is mounted on a mobile vehicle traveling at a high speed.

When the digital broadcasting receiving apparatus is mounted on the mobile vehicle traveling at a high speed, unexpected "ghosts" appear which differ from the normal "delayed waves" (including the foregoing "preghosts" as well) appearing under the multipath environment. Such ghosts, which do not appear at standstill, have a property of increasing their intensity up to a level comparable to the primary wave (true signal) as the speed of the mobile vehicle increases.

Thus, even if it produces the delay profile under the high-speed transfer environment, the conventional example 1 with the foregoing configuration cannot detect the presence of the ghosts, which presents a problem of degrading the estimation accuracy of the conditions of the transmission line.

In addition, since the ghosts differ from the normal delayed waves as described above, when the conventional example 2 with the foregoing configuration carries out the FFT window control, ghosts will change the FFT window control state. As a result, it provides a problem of bringing about a malfunction, thereby causing radio interference.

The present invention is implemented to solve the foregoing problems. Therefore it is an object of the present invention to provide a digital broadcasting receiving apparatus with a channel estimation function capable of improving, when the digital broadcasting receiving apparatus for receiving an OFDM digital broadcast is mounted on a mobile vehicle traveling at a high speed, the receiving performance of a broadcast signal by generating the delay profile in the same manner as the conventional technology, by improving the estimation accuracy of the conditions of the transmission line by enabling the presence/absence decision of the ghosts from the delay profile generated, and by carrying out the FFT window control with taking account of the ghost decision results.

DISCLOSURE OF THE INVENTION

The digital broadcasting receiving apparatus with a channel estimation function in accordance with the present invention includes a Fourier transform circuit for performing Fourier transform of an orthogonal demodulation signal from a time axis signal to a frequency axis signal, the orthogonal demodulation signal being obtained by orthogonal demodulation of an orthogonal frequency division multiplexing signal including a plurality of carriers and a pilot signal; a mode output section for generating and outputting a signal indicating a transmission mode of the orthogonal frequency division multiplexing signal; and a channel estimation section for generating a delay profile signal representing characteristics of delayed wave received power against delay time from the phase and amplitude of the pilot signal extracted from the frequency axis signal fed from the Fourier transform circuit, for generating a decision signal about presence/absence of ghosts by making a decision from the signal indicating the transmission mode as to whether ghosts appearing during traveling of a mobile vehicle are present or not in the delay profile signal, and for storing or outputting the delay profile signal and the decision signal as channel estimation information.

According to the present invention, the digital broadcasting receiving apparatus is configured in such a manner that it includes the channel estimation section for estimating the transmission line of the orthogonal frequency division multiplexing signal; and that the channel estimation section generates the delay profile signal representing the characteristics of the delayed wave received power against the delay time, generates the decision signal about the presence or absence of the ghosts that can occur during traveling of the mobile vehicle, and stores or outputs the delay profile signal and the decision signal as the channel estimation information. Thus, even under the environment in which the digital broadcasting receiving apparatus is mounted on the mobile vehicle traveling at a high speed, it can recognize not only the normal "delayed wave" occurring under the multipath environment, but also the presence or absence of the "ghosts" different from the delayed wave. Accordingly, it can estimate the transmission line of the orthogonal frequency division multiplexing signal even during the traveling of the mobile vehicle, and can improve the channel estimation level.

In addition, carrying out the receiving control of the digital broadcasting receiving apparatus in accordance with the channel estimation results makes it possible to improve the receiving performance of the digital broadcasting receiving apparatus.

BEST MODE FOR CARRYING OUT THE INVENTION

The best mode for carrying out the invention will now be described with reference to the accompanying drawings to explain the present invention in more detail.

Embodiment 1

Figure 1:
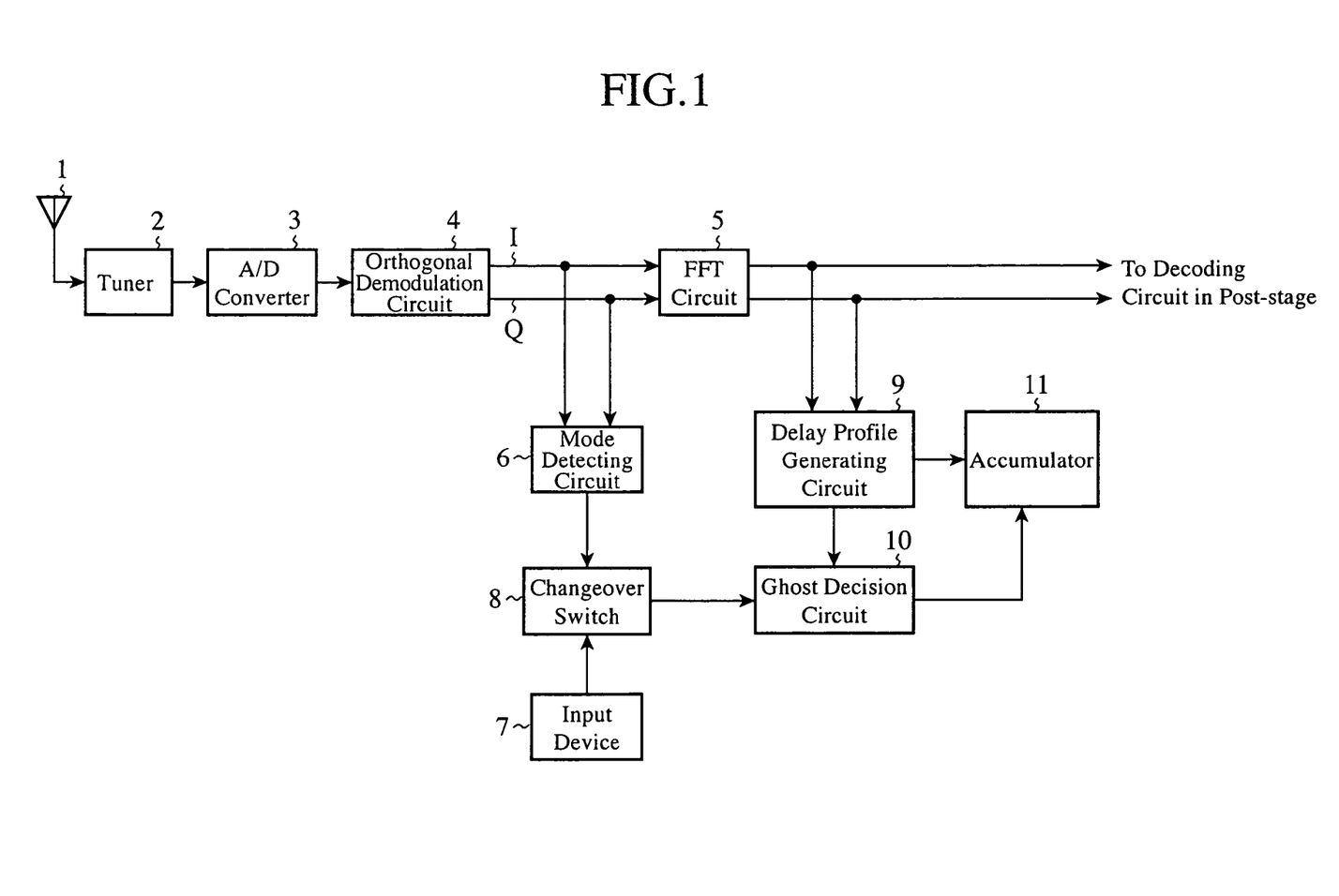
FIG. 1 is a block diagram showing a configuration of a digital broadcasting receiving apparatus with a channel estimation function of an embodiment 1 in accordance with the present invention.

FIG. 1 is a block diagram showing a configuration of a digital broadcasting receiving apparatus with a channel estimation function of an embodiment 1 in accordance with the present invention.

In FIG. 1, the digital broadcasting receiving apparatus with a channel estimation function comprises a receiving antenna 1, a tuner 2, an A/D converter 3, an orthogonal demodulation circuit 4, a Fourier transform circuit (called "FFT circuit" from now on) 5, a mode detecting circuit 6, an input device 7, a changeover switch 8, a delay profile generating circuit 9, a ghost decision circuit 10 and an accumulator 11.

In the foregoing configuration, the tuner 2 selects a desired OFDM digital broadcast from among the broadcast radio waves (RF signals) supplied from the receiving antenna 1, and converts it to an intermediate frequency (IF) signal with a prescribed frequency and level.

The A/D converter 3 converts the intermediate frequency (IF) signal fed from the tuner 2 from an analog to digital signal.

The orthogonal demodulation circuit 4 carries out the orthogonal demodulation of the digital signal fed from the A/D converter 3, and outputs an orthogonal demodulation signal consisting of an I signal (in-phase component) and Q signal (quadrature component).

The FFT circuit 5 performs the Fourier transform of the I signal and Q signal fed from the orthogonal demodulation circuit 4 from the time axis to frequency axis signals.

According to the I signal and Q signal fed from the orthogonal demodulation circuit 4, the mode detecting circuit 6 automatically detects the present transmission mode of the OFDM digital broadcast. In the current Japanese system, the transmission mode has three types of mode 1-mode 3.

The input device 7 is provided for a user to designate and input the transmission mode by manual intervention.

The changeover switch 8 is provided for selecting and switching to a signal indicating one of the transmission mode automatically detected by the mode detecting circuit 6 and the transmission mode designated via the input device 7, which is determined by the user's manual intervention.

The mode detecting circuit 6, input device 7 and changeover switch 8 constitute a mode output section.

The delay profile generating circuit 9, using the frequency axis signal output from the FFT circuit 5, extracts the pilot signal (SP) that is disposed on the frequency axis and is used for the amplitude and phase equalization; performs inverse Fourier transform of the other carriers, which have passed through interpolation, to the time axis signal by using IFFT processing; and generates a delay profile signal by calculating the delayed wave received power against the delay time.

Figure 2:
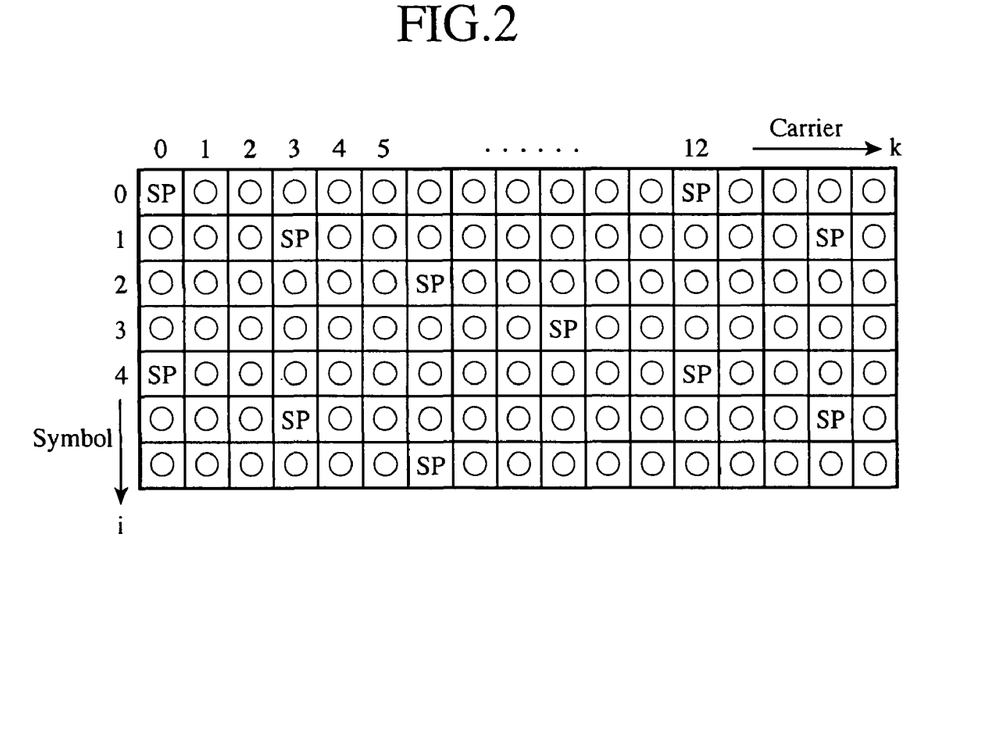
FIG. 2 is a schematic diagram illustrating pilot signal distribution concerning FIG. 1.

The distribution of the pilot signal is shown in FIG. 2, which is a schematic diagram illustrating the pilot signal distribution iii which "○" indicates information data.

As illustrated in FIG. 2, the pilot signal (SP) is disposed at predetermined carrier positions at every 12 carriers and at every 4 symbols to be broadcast. In addition, although the pilot signal undergoes BPSK (binary phase shift keying) modulation to be sent, its phase and amplitude are determined in accordance with the carrier positions at which it is disposed. Thus, checking the variations in the phase and amplitude makes it possible to recognize the frequency characteristics of the transmission line. As for the frequency characteristics of the other information data transmission carriers, they can be estimated by linear interpolation or the like. Thus, the delay profile representing the delayed wave received power against the delay time is obtained by obtaining the power by performing the IFFT processing on the frequency characteristics of all the pilot signals and on the frequency characteristics of all the other carriers estimated.

As to the delay profile signal generated by the delay profile generating circuit 9, the ghost decision circuit 10 checks whether "waves" are present at regular intervals at positions having time intervals corresponding to the frequency intervals of the pilot signal carriers determined by the transmission mode signal fed from the changeover switch 8. If the "waves" are detected at the positions, the ghost decision circuit 10 decides that the "waves" at positions other than the tuning positions as "ghosts", and outputs a decision signal of "ghosting". In contrast with this, unless the "ghost" decision is made, it outputs a decision signal of "not ghosting".

Figure 3:
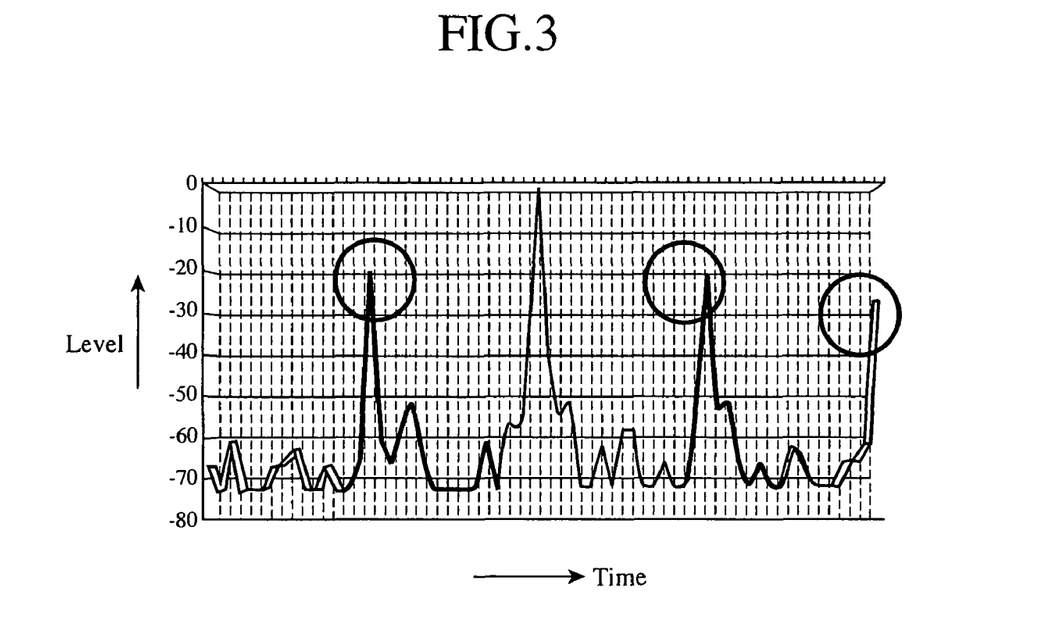
FIG. 3 is a schematic diagram illustrating ghost occurrence concerning FIG. 1.

A manner of the occurrence of the ghost is shown in FIG. 3. FIG. 3 is a schematic diagram illustrating the ghost appearance.

As described before, when the digital broadcasting receiving apparatus is mounted on a mobile vehicle traveling at a high speed, ghosts will appear at positions marked by circles (○) in FIG. 3. The characteristics of the ghosts that differ from the normal delayed waves have already been explained. The ghost decision circuit 10 makes a decision as to the delay profile signal whether the ghosts as illustrated in FIG. 3, which differ from the normal delayed waves, are present or not, and outputs a decision signal as the decision result.

The accumulator 11 stores the delay profile signal generated by the delay profile generating circuit 9. In the course of this, it also stores the decision signal about the presence/absence of the ghosts output from the ghost decision circuit 10 as the channel estimation information.

The delay profile generating circuit 9, ghost decision circuit 10 and accumulator 11 constitute the channel estimation section of the present embodiment 1.

Furthermore, in the foregoing description, the receiving antenna 1, tuner 2, A/D converter 3, orthogonal demodulation circuit 4 and FFT circuit 5 constitute a digital broadcasting receiving function. Besides, the mode output section composed of the mode detecting circuit 6, input device 7 and changeover switch 8, and the channel estimation section composed of the delay profile generating circuit 9, ghost decision circuit 10 and accumulator 11 constitute a channel estimation function.

Next, the basic operation of FIG. 1 will be described.

The tuner 2 selects a desired OFDM digital broadcast from the broadcast radio waves received by the receiving antenna 1, and converts it to the intermediate frequency (IF) signal with the prescribed frequency and level. The A/D converter 3 converts the intermediate frequency (IF) signal to a digital signal, and supplies it to the orthogonal demodulation circuit 4. The orthogonal demodulation circuit 4 performs the orthogonal demodulation of the digital signal fed from the A/D converter 3 to separate it into the I signal and Q signal, and delivers them to the FFT circuit 5 and mode detecting circuit 6.

The FFT circuit 5 transforms the I signal and Q signal fed from the orthogonal demodulation circuit 4 from the time axis signals to the frequency axis signals, and delivers them to a post-stage decoding circuit (not shown) and the delay profile generating circuit 9. The decoding circuit forward restores the original information data of the broadcast.

According to the I signal and Q signal fed from the orthogonal demodulation circuit 4, the mode detecting circuit 6 detects the present transmission mode of the digital broadcast wave, and delivers the signal about the detected transmission mode to the changeover switch 8. The changeover switch 8 selects one of the transmission mode fed from the mode detecting circuit 6 and the transmission mode designated by the input device 7, and delivers the signal about the selected mode to the ghost decision circuit 10.

On the other hand, the delay profile generating circuit 9 extracts the pilot signals (SP) for the amplitude and phase equalization from the frequency axis signal output from the FFT circuit 5; converts the other carriers, which have passed through interpolation, to the time axis signal by the IFFT processing; and generates the delay profile signal by calculating the delayed wave received power against the delay time. The generated delay profile signal is delivered to the ghost decision circuit 10 and accumulator 11.

The ghost decision circuit 10 makes a decision as to the delay profile signal whether the "ghosts" are present or not, and supplies the decision signal to the accumulator 11.

The accumulator 11 stores the delay profile signal generated by the delay profile generating circuit 9 along with the ghost decision signal output from the ghost decision circuit 10.

Next, the deciding operation of the ghost decision circuit 10 will be described with reference to FIG. 4.

Figure 4:
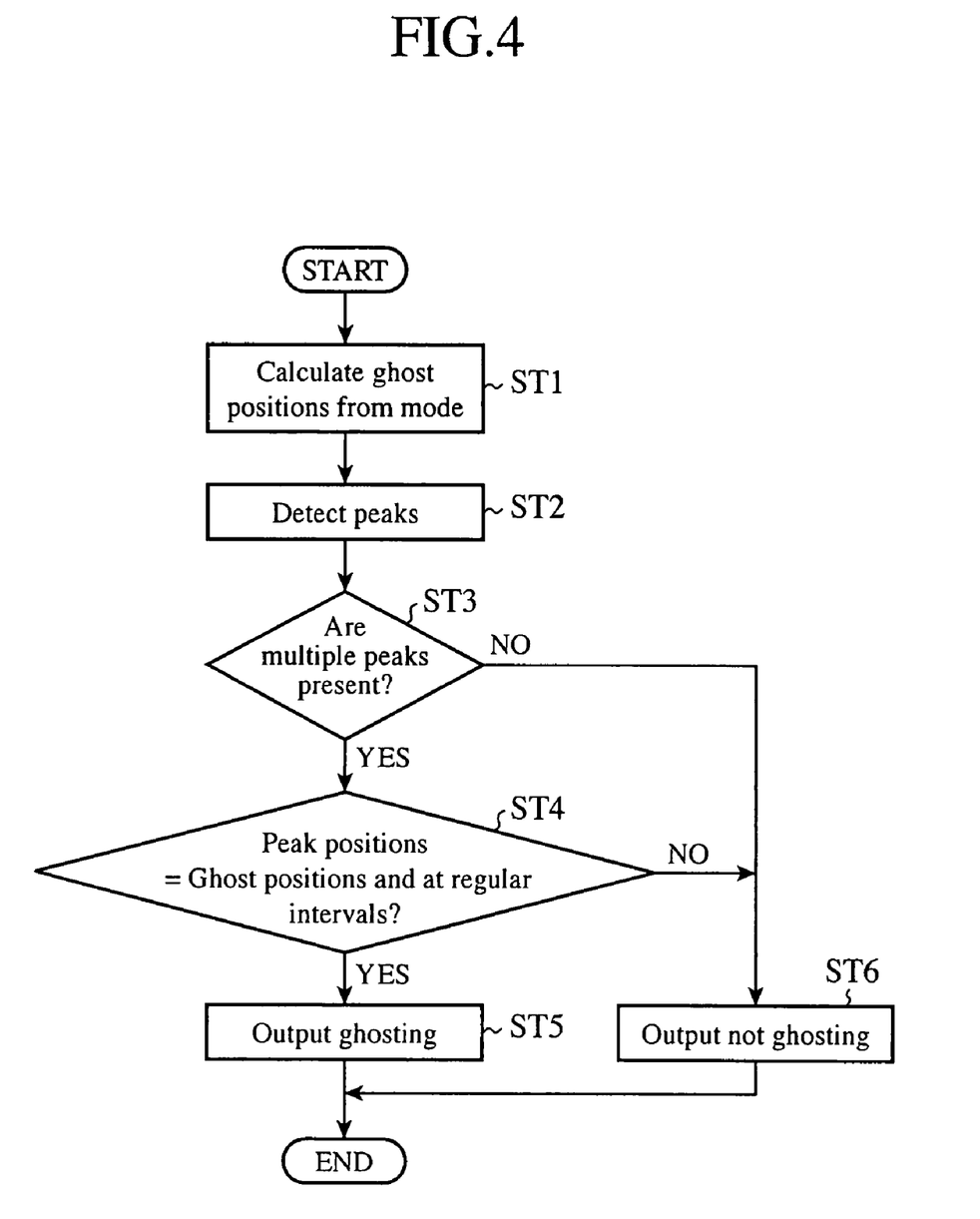
FIG. 4 is a flowchart illustrating ghost deciding processing in a ghost decision circuit of the digital broadcasting receiving apparatus with a channel estimation function of the embodiment 1 in accordance with the present invention.

FIG. 4 is a flowchart illustrating the ghost deciding processing in the ghost decision circuit 10.

At step ST1 in FIG. 4, the ghost decision circuit 10 calculates the frequency intervals of the pilot signal carriers from the transmission mode result, and calculates the ghost positions by calculating the time intervals between the ghosts.

At step ST2, the ghost decision circuit 10 detects a peak with a level equal to or greater than a certain threshold from the delay profile result output from the delay profile generating circuit 9.

At step ST3, the ghost decision circuit 10 makes a decision whether there are a plurality of detected peaks, and proceeds to step ST4 when there are a plurality of peaks (YES at step ST3). Unless there are a plurality of peaks (that is, only a single peak) (NO at step ST3), it proceeds to step ST6.

At step ST4, the ghost decision circuit 10 makes a decision as to whether the positions of the detected peaks agree with the ghost positions calculated at step ST1, and have fixed intervals. If the two conditions are met (YES at step ST4), the processing proceeds to step ST5, and otherwise (NO at step ST4) the processing proceeds to step ST6.

At step ST5, the ghost decision circuit 10 supplies the decision signal "ghosting" to the accumulator 11.

At step ST6, the ghost decision circuit 10 supplies the decision signal "not ghosting" to the accumulator 11.

As described above, the present embodiment 1 is configured in such a manner that the digital broadcasting receiving apparatus includes the delay profile generating circuit 9, ghost decision circuit 10 and accumulator 11 constituting the channel estimation section for estimating the transmission line of the orthogonal frequency division multiplexing signal; and that the delay profile generating circuit 9 generates the delay profile signal representing the characteristics of the delayed wave received power against the delay time; the ghost decision circuit 10 decides the presence or absence of the ghosts that can appear during the traveling of the mobile vehicle according to the transmission mode signal fed from the changeover switch 8; and the accumulator 11 stores the delay profile signal and the decision signal about the presence/absence of the ghosts as the channel estimation information. Accordingly, even under the environment in which the digital broadcasting receiving apparatus is mounted on the mobile vehicle traveling at a high speed, it can recognize not only the normal "delayed waves" occurring under the multipath environment, but also the presence or absence of the "ghosts" different from the delayed waves. Thus, it can estimate the transmission line of the orthogonal frequency division multiplexing signal even during the traveling of the mobile vehicle, thereby being able to improve the level of the channel estimation.

Embodiment 2

Figure 5:
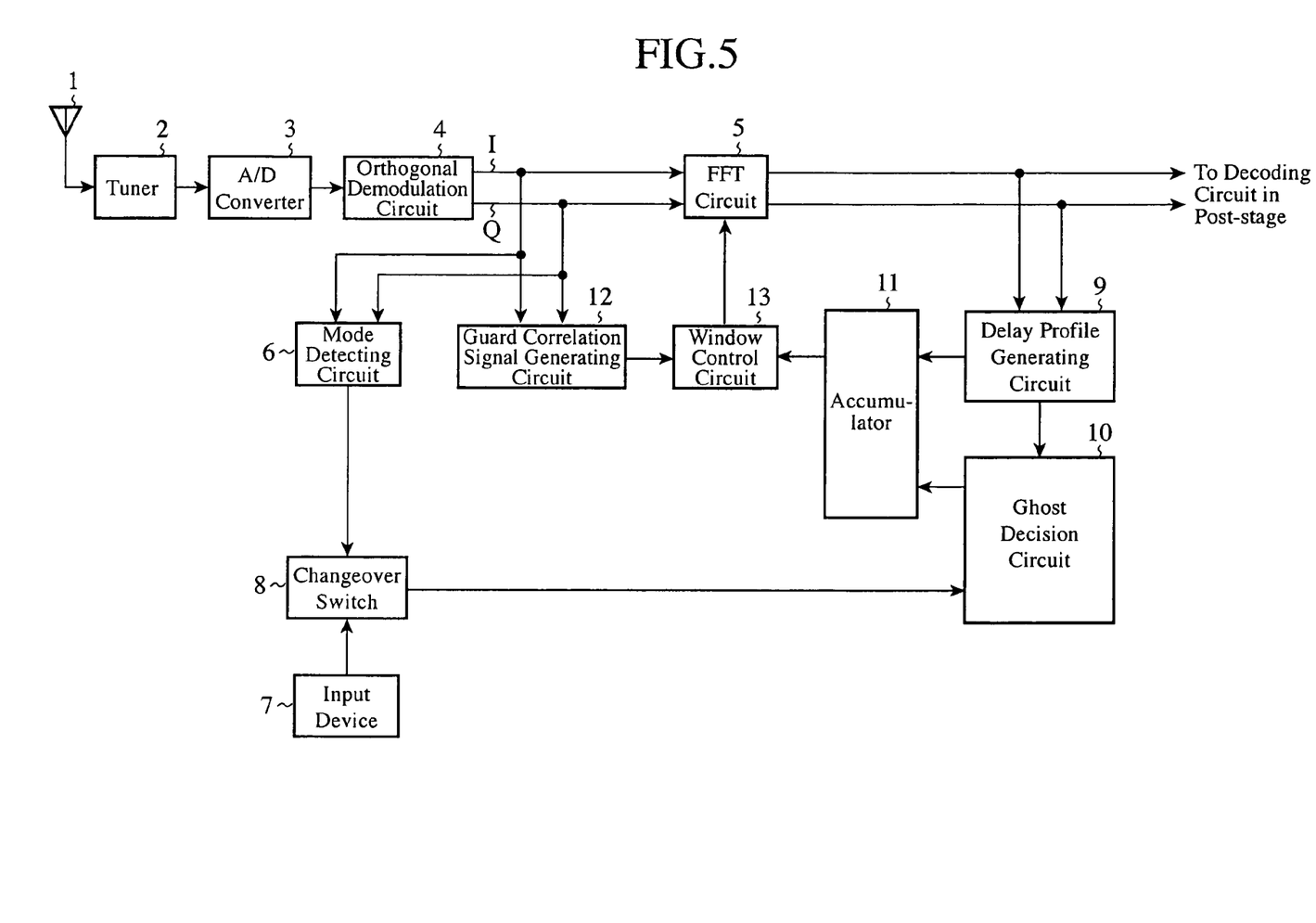
FIG. 5 is a block diagram showing a configuration of the digital broadcasting receiving apparatus with a channel estimation function of an embodiment 2 in accordance with the present invention.

FIG. 5 is a block diagram showing a configuration of the digital broadcasting receiving apparatus with a channel estimation function of an embodiment 2 in accordance with the present invention. It tries to improve the receiving performance of the digital broadcast by carrying out the window control of the FFT circuit 5, which belongs to the receiving function side of the digital broadcasting, by adding the ghost decision result to the delay profile.

In FIG. 5, the same components as those of FIG. 1 are designated by the same reference numerals. The configuration of FIG. 5 differs from that of FIG. 1 in that it includes a guard correlation signal generating circuit 12 and a window control circuit 13. The guard correlation signal generating circuit 12 and window control circuit 13 constitute a Fourier transform control section. Here, the description will be omitted of the components with the same reference numerals as those of FIG. 1.

In the foregoing configuration, according to the I signal and Q signal fed from the orthogonal demodulation circuit 4, the guard correlation signal generating circuit 12 generates a guard correlation signal representing boundary positions of symbols and a symbol length (duration). Incidentally, a guard interval is a fixed time interval inserted between adjacent symbols to reduce the effect of inter-symbol interference between a direct wave (the primary wave that is a true signal wave) and delayed waves. The guard correlation signal is used as a reference signal of the window control of the FFT circuit 5.

The window control circuit 13 sets and controls the position of the "FFT window" that defines the operation duration of the Fourier transform processing in the FFT circuit 5. The FFT window means Fourier transform limits for preventing the inter-symbol interference. To achieve this, the window control circuit 13 sets and controls the FFT window position of the FFT circuit 5 according to the guard correlation signal fed from the guard correlation signal generating circuit 12 and the delay profile signal and ghost information stored in the accumulator 11.

Next, the window control operation of the FFT circuit 5 by the window control circuit 13 of FIG. 5 will be described. Here, the description of the operation of the components with the same reference numerals as those of FIG. 1 will be omitted.

The window control circuit 13 usually sets and controls the FFT window position of the FFT circuit 5 in accordance with the guard correlation signal fed from the guard correlation signal generating circuit 12, for example. In contrast with this, if the delay profile signal fed from the delay profile generating circuit 9 via the accumulator 11 includes delayed waves, and the decision signal fed from the ghost decision circuit 10 via the accumulator 11 indicates "not ghosting", the window control circuit 13 corrects the FFT window position calculated from the guard correlation signal and delay profile signal to circumvent the inter-symbol interference with the delayed waves and the like.

In contrast with this, when the delay profile signal fed from the delay profile generating circuit 9 via the accumulator 11 includes delayed waves, and the decision signal fed from the ghost decision circuit 10 via the accumulator 11 indicates "ghosting", the FFT window position correction according to the delay profile signal is not carried out.

As described above, the present embodiment 2 is configured in such a manner that it includes the window control circuit 13 for setting and controlling the FFT window position of the FFT circuit 5, and the window control circuit 13 is supplied with the delay profile signal representing the conditions of the transmission line and the decision signal about the presence/absence of the ghosts via the accumulator 11 and with the guard correlation signal fed from the guard correlation signal generating circuit 12; and that the window control circuit 13 supplied with the signals usually sets and controls the FFT window position of the FFT circuit 5 according to the guard correlation signal fed from the guard correlation signal generating circuit 12; or corrects the FFT window position calculated from the guard correlation signal and the delay profile signal when the delay profile signal fed from the accumulator 11 includes the delayed waves and the decision signal about the presence/absence of the ghosts indicates "not ghosting"; but does not carry out the correction of the FFT window position by the delay profile signal when the delay profile signal from the accumulator 11 includes the delayed waves and the decision signal about the presence/absence of the ghosts indicates "ghosting". Thus, when the ghosts are absent and the delayed waves are present under the multipath environment, the present embodiment 2 corrects the FFT window position, thereby making it possible to avoid the inter-symbol interference with the delayed waves and the like. In contrast, when the ghosts are present, the present embodiment 2 stops the correction of the FFT window position based on the delay profile signal. This makes it possible to prevent the state changes of the FFT window position control due the ghosts, to avoid the radio interference due to malfunction, and to improve the receiving performance of the broadcast signal.

Embodiment 3

Figure 6:
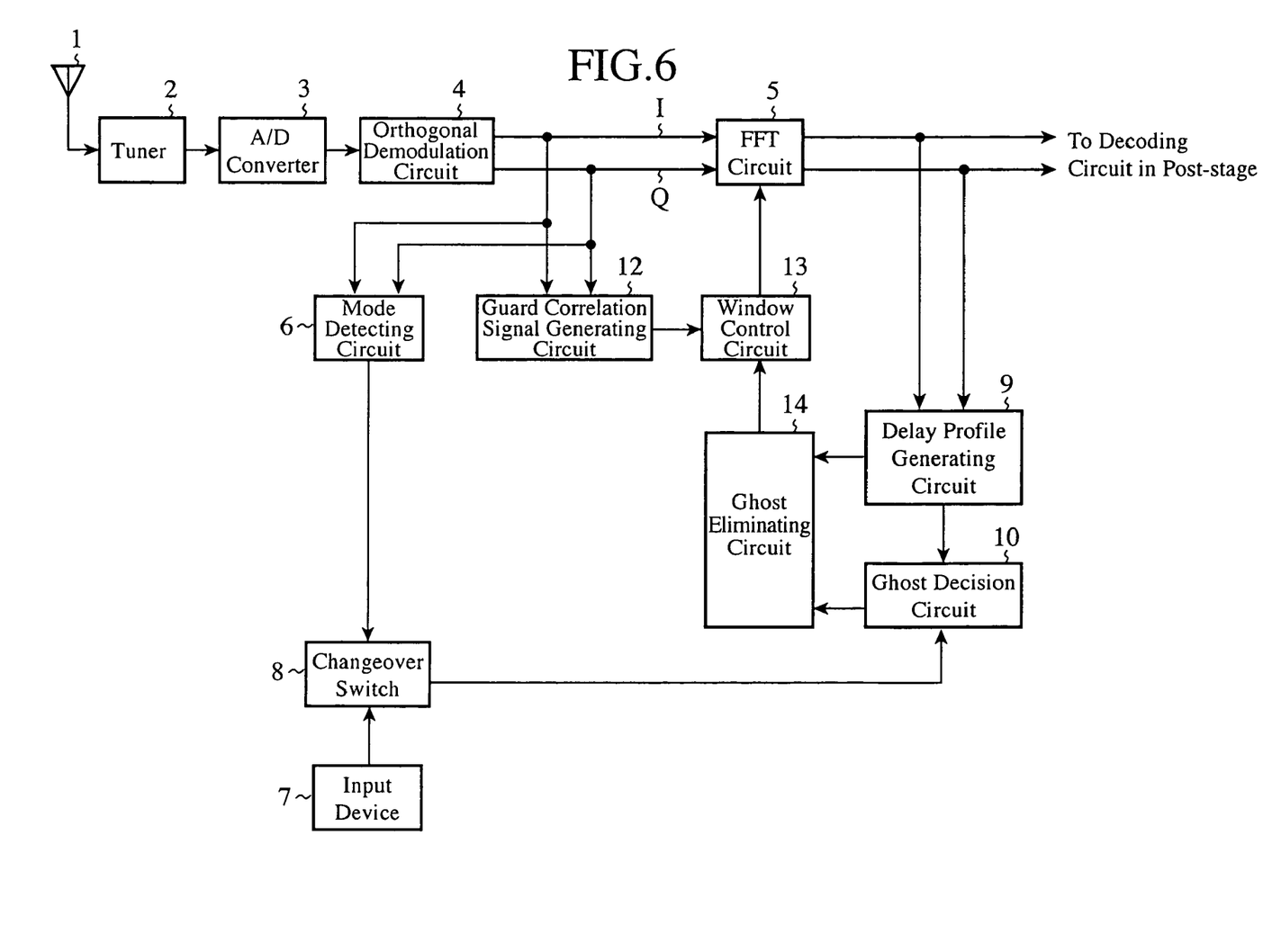
FIG. 6 is a block diagram showing a configuration of the digital broadcasting receiving apparatus with a channel estimation function of an embodiment 3 in accordance with the present invention.

FIG. 6 is a block diagram showing a configuration of the digital broadcasting receiving apparatus with a channel estimation function of an embodiment 3 in accordance with the present invention. It tries to improve the receiving performance of the digital broadcast by eliminating the ghosts that will appear and by carrying out the window control of the FFT circuit 5.

In FIG. 6, the same components as those of FIG. 1 or FIG. 5 are designated by the same reference numerals. The configuration of FIG. 6 differs from that of FIG. 5 in that a ghost eliminating circuit 14 is added, and the accumulator 11 is removed. Here, the description will be omitted of the components with the same reference numerals as those of FIG. 1 or FIG. 5.

In the foregoing configuration, the ghost eliminating circuit 14 is supplied with the delay profile signal output from the delay profile generating circuit 9 and the ghost decision signal output from the ghost decision circuit 10. According to the ghost decision signal fed from the ghost decision circuit 10, when the ghosts are not present, the ghost eliminating circuit 14 supplies the window control circuit 13 with the delay profile signal itself output from the delay profile generating circuit 9. In contrast with this, when the ghosts as shown in FIG. 3 are present, the ghost eliminating circuit 14 reduces the power at the positions where the ghosts occur to a noise level, and supplies the corrected delay profile signal to the window control circuit 13.

As in FIG. 5 (embodiment 2), the window control circuit 13 usually carries out the FFT window position control according to the guard correlation signal fed from the guard correlation signal generating circuit 12. In contrast, when the delay profile signal includes the delayed waves, the window control circuit 13 corrects the FFT window position according to the guard correlation signal and delay profile signal.

As described above, the present embodiment 3 is configured in such a manner that it includes the ghost eliminating circuit 14 for attenuating the ghosts in the delay profile signal to the noise level; and that according to the decision signal about the presence/absence of the ghosts output from the ghost decision circuit 10, the ghost eliminating circuit 14, when the ghosts are not present, supplies the window control circuit 13 with the delay profile signal itself output from the delay profile generating circuit 9, and when the ghosts are present, it supplies the window control circuit 13 with the delay profile signal that is corrected by attenuating the ghosts. Accordingly, the present embodiment 3 can obviate the need for "halting the correction of the FFT window position by the delay profile signal" in the case of "ghosting", which is described in connection with FIG. 5 (embodiment 2) in the control of the FFT circuit 5 by the window control circuit 13. This enables the FFT window position correction even under the ghosting environment. Thus, the present embodiment 3 is able to prevent the changes of state of the FFT window position control due to the ghosts, and to circumvent the radio interference due to the malfunction. In addition, compared with the case of FIG. 5 (embodiment 2), the present embodiment 3 can carry out the normal receiving operation more, and further improve the receiving performance of the broadcast signal.

Embodiment 4

Figure 7:
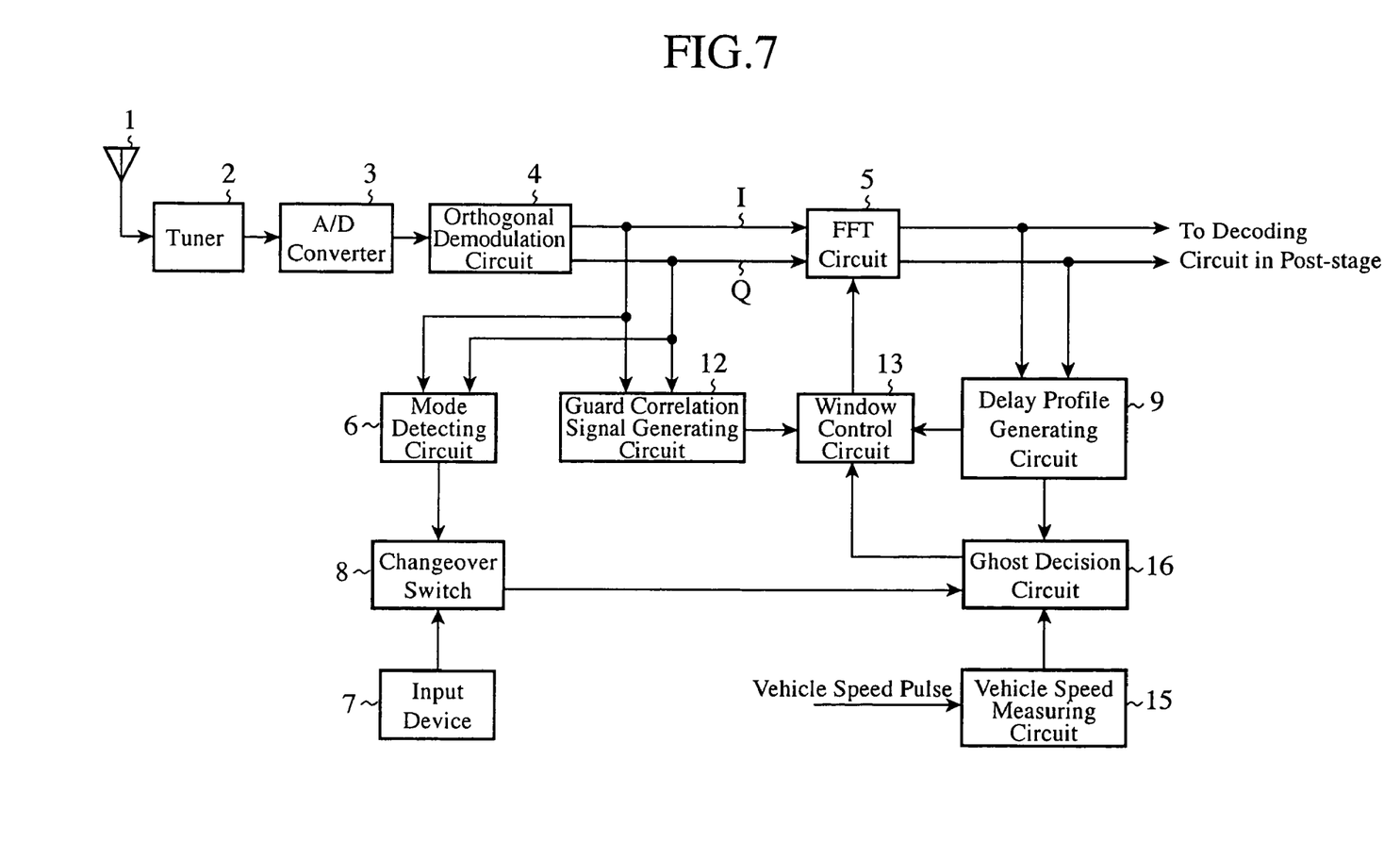
FIG. 7 is a block diagram showing a configuration of the digital broadcasting receiving apparatus with a channel estimation function of an embodiment 4 in accordance with the present invention.

FIG. 7 is a block diagram showing a configuration of the digital broadcasting receiving apparatus with a channel estimation function of an embodiment 4 in accordance with the present invention. It tries to improve the accuracy of the ghost decision by introducing vehicle speed information of the mobile vehicle into the ghost decision in the ghost decision circuit 16.

In FIG. 7, the same components as those of FIG. 1 or FIG. 5 are designated by the same reference numerals. The configuration of FIG. 7 differs from that of FIG. 5 in that it includes a vehicle speed measuring circuit 15, that the ghost decision circuit 16 captures the vehicle speed information to make a ghost decision, and that it eliminates the accumulator 11. The vehicle speed measuring circuit 15, ghost decision circuit 16 and delay profile generating circuit 9 constitute the channel estimation section of the present embodiment 4. Here, the description will be omitted of the components with the same reference numerals as those of FIG. 1 or FIG. 5.

In the foregoing configuration, the vehicle speed measuring circuit 15 receives a vehicle speed pulse signal output from the vehicle, and calculates the present vehicle speed from the vehicle speed pulse signal. The calculated vehicle speed information is delivered to the ghost decision circuit 16. The ghost decision circuit 16 obtains the relative ratio of the ghosts from the vehicle speed. Then, it decides as "ghosting" the waves that are present at regular intervals at the time interval positions corresponding to the pilot signal intervals, have a value comparable to the relative ratio and are out of the tuning positions. The ghost decision circuit 16 supplies the "ghosting" decision signal to the window control circuit 13. In contrast with this, unless the "ghosting" decision is made, it outputs the "not ghosting" decision signal.

Receiving the decision signal and the delay profile signal output from the delay profile generating circuit 9, the window control circuit 13 controls the FFT window position of the FFT circuit 5 in the same manner as that of FIG. 5 (embodiment 2).

Figure 8:
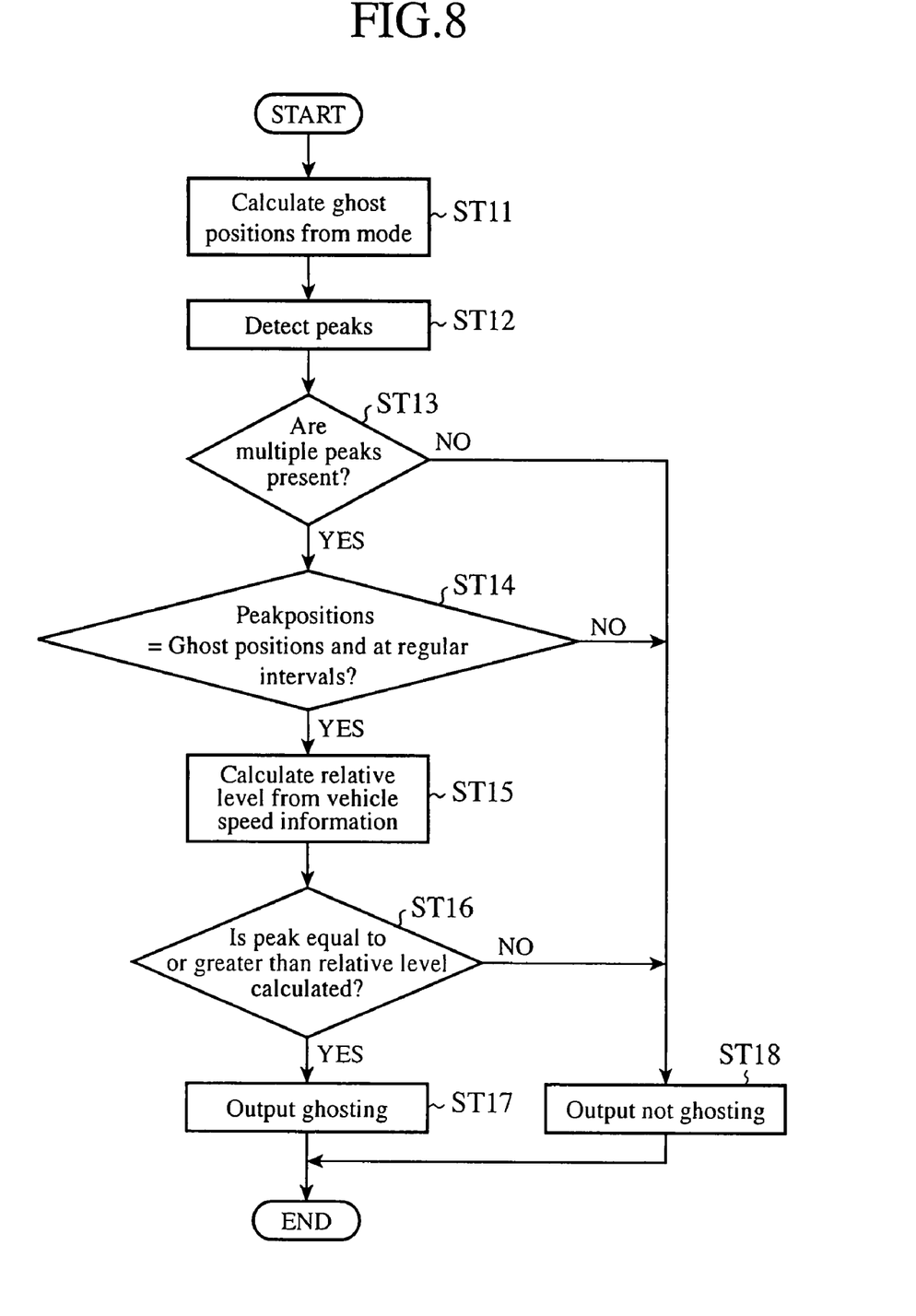
FIG. 8 is a flowchart illustrating the ghost deciding processing in the ghost decision circuit of the digital broadcasting receiving apparatus with a channel estimation function of the embodiment 4 in accordance with the present invention.

Next, the deciding operation of the ghost decision circuit 16 in the present embodiment 4 will be described with reference to FIG. 8. FIG. 8 is a flowchart illustrating the ghost decision processing in the ghost decision circuit 16.

In FIG. 8, the processing from step ST11 to step ST14 is the same as the processing from step ST1 to step ST4 in FIG. 4 (embodiment 1). Accordingly, the description will be omitted here.

At step ST15, when the peak positions detected at step ST14 agree with the ghost positions calculated at step ST11 and occur at regular intervals (YES at step ST14), the ghost decision circuit 16 calculates the relative level of the ghosts from the vehicle speed information fed from the vehicle speed measuring circuit 15.

At step ST16, the ghost decision circuit 16 makes a decision as to whether the detected peaks are equal to or greater than the relative level of the ghosts calculated at step ST15. If the peaks are equal to or greater than the calculated relative level (YES at step ST16), the processing proceeds to step ST17, and otherwise (No at step ST16), the processing proceeds to step ST18.

At step ST17, the ghost decision circuit 16 supplies the window control circuit 13 with the "ghosting" decision signal.

At step ST18, the ghost decision circuit 16 supplies the window control circuit 13 with the "not ghosting" decision signal.

As in FIG. 4 (embodiment 1), the "not ghosting" decision signal at step ST18 is supplied to the window control circuit 13 in the case of "NO at step ST13" or "NO at step ST14".

The channel estimation section of the present embodiment 4 can be applied to the configuration of FIG. 1.

As described above, the present embodiment 4 is configured in such a manner that it has the vehicle speed measuring circuit 15 for calculating the present vehicle speed from the vehicle speed pulse signal output from the vehicle, and that the ghost decision circuit 16 takes account of the vehicle speed information the vehicle speed measuring circuit 15 calculates in making the presence/absence decision of the ghosts in the delay profile signal fed from the delay profile generating circuit 9. Accordingly, the present embodiment 4 can improve the ghost decision accuracy as compared with the embodiment 1 (FIG. 4). This makes it possible to improve the window position control of the FFT circuit 5 by the window control circuit 13 using the ghost decision results, and to improve the receiving performance of the broadcast signal.

Embodiment 5

Figure 9:
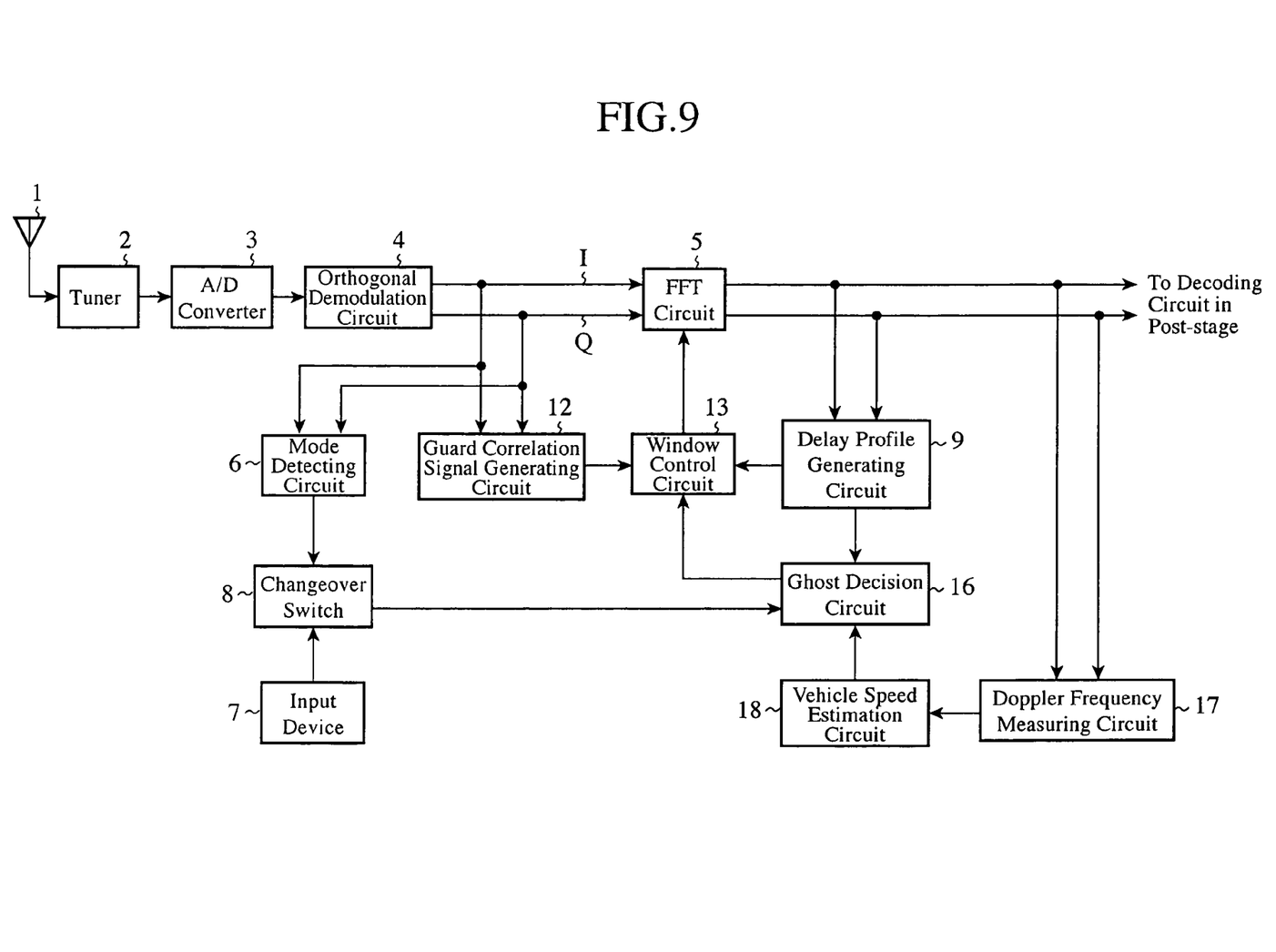
FIG. 9 is a block diagram showing a configuration of the digital broadcasting receiving apparatus with a channel estimation function of an embodiment 5 in accordance with the present invention.

FIG. 9 is a block diagram showing a configuration of the digital broadcasting receiving apparatus with a channel estimation function of an embodiment 5 in accordance with the present invention. The present embodiment 5 tries to improve the ghost decision accuracy by estimating the mobile vehicle speed from the Doppler frequency, and by introducing the vehicle speed estimation information into the ghost decision in the ghost decision circuit 16.

In FIG. 9, the same components as those of FIG. 1 or FIG. 7 are designated by the same reference numerals. The configuration of FIG. 9 differs from that of FIG. 7 in that it has a Doppler frequency measuring circuit 17 and a vehicle speed estimation circuit 18 in place of the vehicle speed measuring circuit 15 of FIG. 7; and that it introduces the estimated vehicle speed information into the ghost decision in the ghost decision circuit 16. The Doppler frequency measuring circuit 17, vehicle speed estimation circuit 18, delay profile generating circuit 9 and ghost decision circuit 16 constitute the channel estimation section of the present embodiment 5. Here, the description will be omitted of the components with the same reference numerals as those of FIG. 1 or FIG. 7.

In the foregoing configuration, the Doppler frequency measuring circuit 17 calculates the Doppler frequency by using the continuous pilot signal in the frequency axis signal output from the FFT circuit 5, and supplies the Doppler frequency information to the vehicle speed estimation circuit 18. The vehicle speed estimation circuit 18 estimates the present vehicle speed from the Doppler frequency, and supplies the ghost decision circuit 16 with the vehicle speed estimation information.

In the broadcasting system that transmits the continuous pilot signal, since the continuous pilot signal is a pilot that keeps the symbol phase constant, the Doppler frequency can be calculated from the phase variations in the time elapse. The vehicle speed can be estimated from the relationships between the Doppler frequency and the receiving frequency (RF). Thus, the ghost decision circuit 16 can obtain the relative ratio of the ghosts from vehicle speed estimation information.

The subsequent operation of the ghost decision circuit 16 is the same as that of FIG. 7 (embodiment 4).

The channel estimation section in the present embodiment 5 is applicable to the configuration of FIG. 1.

As described above, the present embodiment 5 is configured in such a manner that it has the Doppler frequency measuring circuit 17 for calculating the Doppler frequency by using the continuous pilot signal in the frequency axis signal output from the FFT circuit 5, and the vehicle speed estimation circuit 18 for estimating the present vehicle speed from the Doppler frequency calculated; and that the ghost decision circuit 16 makes the ghost presence/absence decision in the delay profile signal fed from the delay profile generating circuit 9 with taking account of the vehicle speed information the vehicle speed estimation circuit 18 estimates. Accordingly, the present embodiment 5 can make the ghost decision using the estimated vehicle speed even when the vehicle speed measuring circuit 15 of FIG. 7 (embodiment 4) cannot be mounted because of the difficulty of capturing the vehicle speed pulse from the vehicle. This makes it possible as in the embodiment 4 to improve the ghost decision accuracy compared with the embodiment 1 (FIG. 4). As a result, the present embodiment 5 can improve the window position control of the FFT circuit 5 by the window control circuit 13 using the ghost decision results, and improve the receiving performance of the broadcast signal.

INDUSTRIAL APPLICABILITY

As described above, the digital broadcasting receiving apparatus with a channel estimation function in accordance with the present invention can estimate the conditions of the information transmission line under the mobile receiving environments of the OFDM digital broadcast. In addition, since it can improve the receiving performance by controlling the receiving state in response to the estimation results, it is suitably used as a digital broadcasting receiving apparatus mounted on a mobile vehicle.

What is claimed is:

1. A digital broadcasting receiving apparatus with a channel estimation function comprising:

a Fourier transform circuit for performing Fourier transform of an orthogonal demodulation signal from a time axis signal to a frequency axis signal, said orthogonal demodulation signal being obtained by orthogonal demodulation of an orthogonal frequency division multiplexing signal including a plurality of carriers for transmitting information with distributing the information and a pilot signal serving as a reference of amplitude/phase;

a mode output section for generating and outputting a signal indicating a transmission mode of the orthogonal frequency division multiplexing signal in response to automatic detection from the orthogonal demodulation signal or to manual designation; and a channel estimation section for extracting the pilot signal from the frequency axis signal fed from said Fourier transform circuit, for generating from extracted phase and amplitude of the pilot signal a delay profile signal representing characteristics of delayed wave received power against delay time, for providing a present vehicle speed data of a mobile vehicle for generating a decision signal about presence/absence of ghosts by making a decision from the signal indicating the transmission mode and the vehicle speed data as to whether ghosts appearing during traveling of the mobile vehicle are present or not in the delay profile signal, and for storing or outputting the delay profile signal and the decision signal as channel estimation information.

2. The digital broadcasting receiving apparatus with a channel estimation function according to claim 1, further comprising a Fourier transform control section for generating from the orthogonal demodulation signal a guard correlation signal that indicates a boundary position between a guard interval, which is inserted between symbols of an information signal, and the symbol, and indicates a symbol length including the guard interval; and for carrying out, in response to the guard correlation signal generated and to the delay profile signal and the decision signal about the presence/absence of the ghosts fed from the channel estimation section, setting control of window positions that define Fourier transform operation duration of the Fourier transform circuit in a manner that will prevent inter-symbol interference between a primary wave which is a true signal wave and a delayed wave.

3. The digital broadcasting receiving apparatus with a channel estimation function according to claim 1, wherein said channel estimation section comprises:

a delay profile generating circuit for extracting the pilot signal from the frequency axis signal fed from said Fourier transform circuit, and for generating the delay profile signal representing the characteristics of the delayed wave received power against the delay time from the phase and amplitude of the pilot signal extracted;

a ghost decision circuit for making a decision from the signal indicating the transmission mode fed from said mode output section as to whether the delay profile signal includes the ghosts appearing during traveling of the mobile vehicle, and for generating the decision signal about the presence/absence of the ghosts; and an accumulator for storing the delay profile signal fed from said delay profile generating circuit and the decision signal fed from said ghost decision circuit.

4. The digital broadcasting receiving apparatus with a channel estimation function according to claim 2, further comprising:

a ghost eliminating circuit for outputting, in response to the delay profile signal and the decision signal about the presence/absence of the ghosts fed from said channel estimation section, the delay profile signal when the decision signal indicates absence of the ghosts, and the delay profile signal from which ghost components are eliminated when the decision signal indicates presence of the ghosts, wherein said Fourier transform control section carries out setting control of the window positions of said Fourier transform circuit in response to the delay profile signal fed from said ghost eliminating circuit and to the guard correlation signal.

5. A digital broadcasting receiving apparatus with a channel estimation function comprising:

a Fourier transform circuit for performing Fourier transform of an orthogonal demodulation signal from a time axis signal to a frequency axis signal, said orthogonal demodulation signal being obtained by orthogonal demodulation of an orthogonal frequency division multiplexing signal including a plurality of carriers for transmitting information with distributing the information and a pilot signal serving as a reference of amplitude/phase;

a mode output section for generating and outputting a signal indicating a transmission mode of the orthogonal frequency division multiplexing signal in response to automatic detection from the orthogonal demodulation signal or to manual designation; and a channel estimation section for extracting the pilot signal from the frequency axis signal fed from said Fourier transform circuit, for generating from extracted phase and amplitude of the pilot signal a delay profile signal representing characteristics of delayed wave received power against delay time, for generating a decision signal about presence/absence of ghosts by making a decision from the signal indicating the transmission mode fed from said mode output section as to whether ghosts appearing during traveling of a mobile vehicle are present or not in the delay profile signal, and for storing or outputting the delay profile signal and the decision signal as channel estimation information, wherein said channel estimation section comprises:

a delay profile generating circuit for extracting the pilot signal from the frequency axis signal fed from said Fourier transform circuit, and for generating the delay profile signal representing the characteristics of the delayed wave received power against the delay time from the phase and amplitude of the pilot signal extracted;

a vehicle speed measuring circuit for calculating a present vehicle speed from a vehicle speed pulse signal fed from the mobile vehicle; and a ghost decision circuit for making a decision from the signal indicating the transmission mode fed from said mode output section and vehicle speed data fed from said vehicle speed measuring circuit as to whether the delay profile signal includes the ghosts appearing during traveling of the mobile vehicle, and for generating the decision signal about the presence/absence of the ghosts.

6. A digital broadcasting receiving apparatus with a channel estimation function comprising:

a Fourier transform circuit for performing Fourier transform of an orthogonal demodulation signal from a time axis signal to a frequency axis signal, said orthogonal demodulation signal being obtained by orthogonal demodulation of an orthogonal frequency division multiplexing signal including a plurality of carriers for transmitting information with distributing the information and a pilot signal serving as a reference of amplitude/phase;

a mode output section for generating and outputting a signal indicating a transmission mode of the orthogonal frequency division multiplexing signal in response to automatic detection from the orthogonal demodulation signal or to manual designation;

a channel estimation section for extracting the pilot signal from the frequency axis signal fed from said Fourier transform circuit, for generating from extracted phase and amplitude of the pilot signal a delay profile signal representing characteristics of delayed wave received power against delay time, for generating a decision signal about presence/absence of ghosts by making a decision from the signal indicating the transmission mode fed from said mode output section as to whether ghosts appearing during traveling of a mobile vehicle are present or not in the delay profile signal, and for storing or outputting the delay profile signal and the decision signal as channel estimation information;

a delay profile generating circuit for extracting the pilot signal from the frequency axis signal fed from said Fourier transform circuit, and for generating the delay profile signal representing the characteristics of the delayed wave received power against the delay time from the phase and amplitude of the pilot signal extracted;

a Doppler frequency measuring circuit for calculating a Doppler frequency by using a continuous pilot signal included in the frequency axis signal from said Fourier transform circuit;

a vehicle speed estimation circuit for estimating a present vehicle speed from the Doppler frequency said Doppler frequency measuring circuit calculates; and a ghost decision circuit for making a decision from the signal indicating the transmission mode fed from said mode output section and estimated vehicle speed data fed from said vehicle speed estimation circuit as to whether the delay profile signal includes the ghosts appearing during traveling of the mobile vehicle, and for generating the decision signal about the presence/absence of the ghosts.

7. A digital broadcasting receiving method with a channel estimation function comprising:

performing Fourier transform of an orthogonal demodulation signal from a time axis signal to a frequency axis signal, said orthogonal demodulation signal being obtained by orthogonal demodulation of an orthogonal frequency division multiplexing signal including a plurality of carriers for transmitting information with distributing the information and a pilot signal serving as a reference of amplitude/phase;

generating and outputting a signal indicating a transmission mode of the orthogonal frequency division multiplexing signal in response to automatic detection from the orthogonal demodulation signal or to manual designation;

extracting the pilot signal from the frequency axis signal;

generating from extracted phase and amplitude of the pilot signal a delay profile signal representing characteristics of delayed wave received power against delay time;

generating a present vehicle speed data of a mobile vehicle;

generating a decision signal about presence/absence of ghosts by making a decision from the signal indicating the transmission mode and the vehicle speed data as to whether ghosts appearing during traveling of a mobile vehicle are present or not in the delay profile signal; and storing or outputting the delay profile signal and the decision signal as channel estimation information.

8. The digital broadcasting receiving method with a channel estimation function according to claim 7, further comprising:

generating from the orthogonal demodulation signal a guard correlation signal that indicates a boundary position between a guard interval, which is inserted between symbols of an information signal, and the symbol, and indicates a symbol length including the guard interval; and carrying out, in response to the guard correlation signal generated and to the delay profile signal and the decision signal about the presence/absence of the ghosts, setting control of window positions that define Fourier transform operation duration in a manner that will prevent inter-symbol interference between a primary wave which is a true signal wave and a delayed wave.

9. The digital broadcasting receiving method with a channel estimation function according to claim 7, further comprising:

extracting the pilot signal from the frequency axis signal and generating the delay profile signal representing the characteristics of the delayed wave received power against the delay time from the phase and amplitude of the pilot signal extracted;

making a decision from the signal indicating the transmission mode as to whether the delay profile signal includes the ghosts appearing during traveling of the mobile vehicle, and generating the decision signal about the presence/absence of the ghosts; and storing the delay profile signal and the decision signal fed.

10. The digital broadcasting receiving method with a channel estimation function according to claim 8, further comprising:

outputting, in response to the delay profile signal and the decision signal about the presence/absence of the ghosts, the delay profile signal when the decision signal indicates absence of the ghosts, and the delay profile signal from which ghost components are eliminated when the decision signal indicates presence of the ghosts; and setting control of the window positions in response to the delay profile signal and to the guard correlation signal.

11. A digital broadcasting receiving method with a channel estimation function comprising:

performing Fourier transform of an orthogonal demodulation signal from a time axis signal to a frequency axis signal, said orthogonal demodulation signal being obtained by orthogonal demodulation of an orthogonal frequency division multiplexing signal including a plurality of carriers for transmitting information with distributing the information and a pilot signal serving as a reference of amplitude/phase;

generating and outputting a signal indicating a transmission mode of the orthogonal frequency division multiplexing signal in response to automatic detection from the orthogonal demodulation signal or to manual designation;

extracting the pilot signal from the frequency axis signal, and generating a delay profile signal representing the characteristics of delayed wave received power against delay time from the phase and amplitude of the pilot signal extracted;

calculating a present vehicle speed of a mobile vehicle from a vehicle speed pulse signal;

making a decision from the signal indicating the transmission mode and vehicle speed data as to whether the delay profile signal includes the ghosts appearing during traveling of the mobile vehicle, and generating the decision signal about the presence/absence of the ghosts.

12. A digital broadcasting receiving method with a channel estimation function comprising:

performing Fourier transform of an orthogonal demodulation signal from a time axis signal to a frequency axis signal, said orthogonal demodulation signal being obtained by orthogonal demodulation of an orthogonal frequency division multiplexing signal including a plurality of carriers for transmitting information with distributing the information and a pilot signal serving as a reference of amplitude/phase;

generating and outputting a signal indicating a transmission mode of the orthogonal frequency division multiplexing signal in response to automatic detection from the orthogonal demodulation signal or to manual designation extracting the pilot signal from the frequency axis signal, and generating a delay profile signal representing the characteristics of delayed wave received power against delay time from the phase and amplitude of the pilot signal extracted;

calculating a Doppler frequency by using a continuous pilot signal included in the frequency axis signal;

estimating a present vehicle speed from the Doppler frequency; and making a decision from the signal indicating the transmission mode and estimated vehicle speed data as to whether the delay profile signal includes the ghosts appearing during traveling of the mobile vehicle, and generating the decision signal about the presence/absence of the ghosts.

* * * * *